United States Patent
Kano

(10) Patent No.: US 8,673,501 B2
(45) Date of Patent: Mar. 18, 2014

(54) ANODE AND BATTERY USING SAME

(75) Inventor: Gentaro Kano, Fukushima (JP)

(73) Assignee: Sony Corporation, Tokyo (JP)

( * ) Notice: Subject to any disclaimer, the term of this patent is extended or adjusted under 35 U.S.C. 154(b) by 774 days.

(21) Appl. No.: 11/338,709

(22) Filed: Jan. 25, 2006

(65) Prior Publication Data

US 2006/0183023 A1    Aug. 17, 2006

(30) Foreign Application Priority Data

Feb. 9, 2005 (JP) .................................. 2005-033443

(51) Int. Cl.
*H01M 4/583* (2010.01)
*H01M 4/133* (2010.01)
*H01M 4/1393* (2010.01)

(52) U.S. Cl.
USPC ..................................................... 429/231.8

(58) Field of Classification Search
USPC ..................................................... 429/231.8
See application file for complete search history.

(56) References Cited

U.S. PATENT DOCUMENTS

| | | | | |
|---|---|---|---|---|
| 6,139,990 | A | * | 10/2000 | Kubota et al. ............ 429/231.8 |
| 6,617,075 | B2 | * | 9/2003 | Mao et al. ............... 429/231.95 |
| 2002/0197201 | A1 | * | 12/2002 | Fukuda et al. ................ 423/448 |
| 2004/0224230 | A1 | * | 11/2004 | Yanagida et al. .......... 429/231.8 |

FOREIGN PATENT DOCUMENTS

| JP | 05290844 | A | * | 11/1993 |
|---|---|---|---|---|
| JP | 2000226206 | A | * | 8/2000 |
| JP | 2004-63423 | | | 2/2004 |
| JP | 2004-127913 | | | 4/2004 |
| JP | 2004196609 | A | * | 7/2004 |

* cited by examiner

*Primary Examiner* — Gregg Cantelmo
(74) *Attorney, Agent, or Firm* — Oblon, Spivak, McClelland, Maier & Neustadt, L.L.P.

(57) ABSTRACT

An anode and a battery, which have a high capacity and can improve battery characteristics such as large current discharge characteristics and low temperature discharge characteristics are provided. An anode has an anode current collector and an anode active material layer provided on the anode current collector. The density of the anode active material layer is in the range from 1.5 g/cm³ to 1.8 g/cm³. Further, the anode active material layer contains a granulated graphite material which is obtained by granulating a flat graphite particle in nodular shape and mesocarbon microbeads. Thereby, the granulated graphite material is prevented from being destroyed, and diffusion path of lithium ions is secured.

5 Claims, 9 Drawing Sheets

ANODE AND BATTERY USING SAME

CROSS REFERENCES TO RELATED APPLICATIONS

The present invention contains subject matter related to Japanese Patent Application JP 2005-33443 filed in the Japanese Patent Office on Feb. 9, 2005, the entire contents of which being incorporated herein by reference.

BACKGROUND OF THE INVENTION

1. Field of the Invention

The present invention relates to an anode containing a material obtained by granulating flat graphite in nodular shape and a battery using it.

2. Description of the Related Art

In recent years, many portable electronic devices such as a combination camera (videotape recorder), a mobile phone, and a laptop computer have been introduced, and their size and weight have been reduced. Accordingly, research and development for improving energy density of batteries, particularly of secondary batteries as a portable power source for these electronic devices has been actively promoted. Specially, lithium ion secondary batteries using carbon materials for the anode are very promising since such lithium ion secondary battery can provide a high energy density compared to lead batteries or nickel cadmium batteries, which are traditional aqueous electrolytic solution secondary batteries.

As a carbon material, there is natural graphite, artificial graphite such as mesocarbon microbeads or the like. Of the foregoing, natural graphite has advantages that the discharge capacity is large compared to artificial graphite and the battery capacity can be enlarged. However, natural graphite generally has a flat shape such as scale-like shape. Therefore, there has been a disadvantage that when the anode is compression-molded, for example, as shown in FIG. 1 by a model, long sides of graphite particles 112A are arranged parallel to the surface of an anode 110, diffusion path of lithium ions in the anode 110 are decreased, and large current discharge characteristics, low temperature discharge characteristics and the like are lowered.

Therefore, it is reported that for example, as shown in FIG. 2 by a model, by using a granulated graphite material 112B obtained by granulating such a flat graphite particle 112A in nodular shape, the long sides of the graphite particles 112A are inhibited from being arranged parallel to the surface of the anode 110, and large current discharge characteristics and low temperature discharge characteristics can be improved (for example, refer to Japanese Unexamined Patent Application Publication Nos. H10-334915, H11-263612, 2000-226206, 2002-179419, and 2003-119014).

SUMMARY OF THE INVENTION

However, there is a disadvantage that when the density of the anode active material layer is increased to 1.5 g/cm$^3$ or more in order to improve the battery capacity, granulated secondary particles are destroyed, the flat graphite particles are arranged parallel to the surface of the anode, and large current discharge characteristics and low temperature discharge characteristics are decreased.

In view of the foregoing, in the present invention, it is desirable to provide an anode and a battery, which have a high capacity and can improve battery characteristics such as large current discharge characteristics and low temperature discharge characteristics.

According to an embodiment of the present invention, there is provided an anode having an anode current collector and an anode active material layer provided on the anode current collector, in which the anode active material layer has a density in the range from 1.5 g/cm$^3$ to 1.8 g/cm$^3$, and contains a granulated graphite material obtained by granulating a flat graphite particle in nodular shape and mesocarbon microbeads.

According to an embodiment of the present invention, there is provided a battery including a cathode, an anode, and an electrolyte, in which the anode has an anode current collector and an anode active material layer provided on the anode current collector, the anode active material layer has a density in the range from 1.5 g/cm$^3$ to 1.8 g/cm$^3$, and contains a granulated graphite material which is obtained by granulating a flat graphite particle in nodular shape and mesocarbon microbeads.

According to the anode of the embodiment of the present invention, the anode active material layer has a density in the range from 1.5 g/cm$^3$ to 1.8 g/cm$^3$, and contains the granulated graphite material which is obtained by granulating the flat graphite particle in nodular shape. Therefore, a high capacity can be thereby obtained. Further, since the anode active material layer contains the mesocarbon microbeads, a secondary particle which is granulated in nodular shape is inhibited from being destroyed. Consequently, according to the battery of the embodiment of the present invention using the foregoing anode, the capacity can be increased and battery characteristics such as large current discharge characteristics and low temperature discharge characteristics can be improved.

In particular, when the weight ratio of the mesocarbon microbeads to the total of the granulated graphite material and the mesocarbon microbeads (mesocarbon microbeads/granulated graphite material+mesocarbon microbeads) is in the range from 10% to 50%, higher effects can be obtained.

Other and further objects, features and advantages of the invention will appear more fully from the following description.

DETAILED DESCRIPTION OF THE PREFERRED EMBODIMENT

An embodiment of the present invention will be hereinafter described in detail with reference to the drawings.

Figure 1:
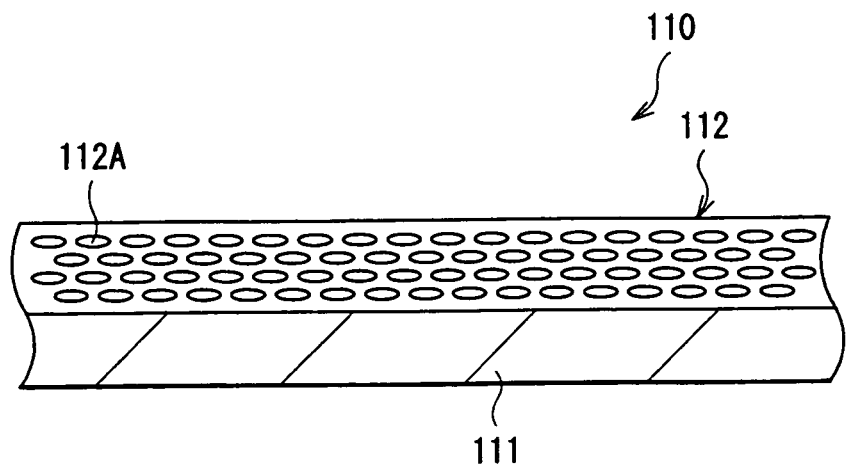
FIG. 1 is a cross section showing a model of a structure of an anode of the related art.
Figure 2:
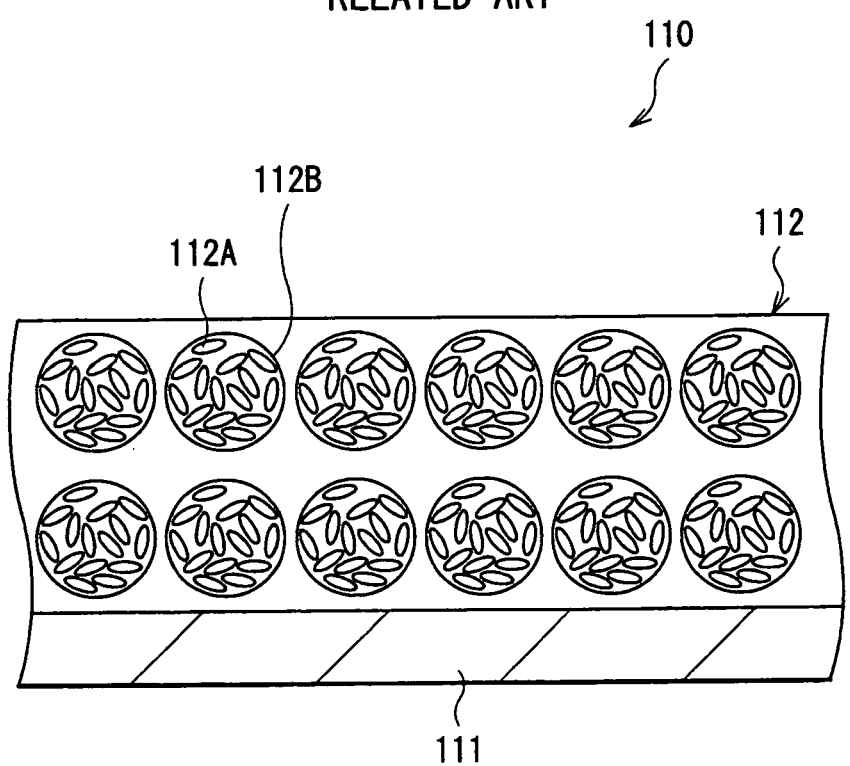
FIG. 2 is another cross section showing a model of a structure of an anode of the related art.
Figure 3:
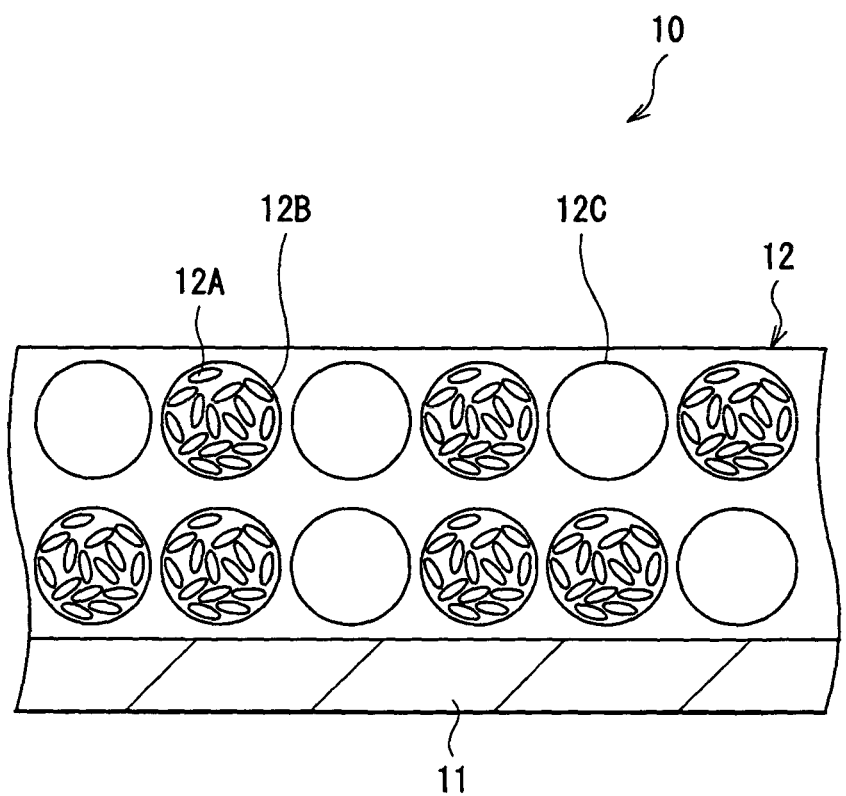
FIG. 3 is a cross section showing a model of a structure of an anode according to an embodiment of the present invention.

FIG. 3 shows a model structure of an anode 10 according to an embodiment of the present invention. The anode 10 has, for example, an anode current collector 11 having a pair of opposed faces and an anode active material layer 12 provided on the single face of the anode current collector 11. Though not shown, the anode active material layer 12 may be provided on the both faces of the anode current collector 11.

The anode current collector 11 preferably has favorable electrochemical stability, electric conductivity, and mechanical strength, and is made of a metal material such as copper (Cu), nickel (Ni), and stainless.

The anode active material layer 12 contains, as an anode active material, a carbon material capable of inserting and extracting lithium or the like. The anode active material layer 12 may contain a binder such as polyvinylidene fluoride according to needs. As a carbon material capable of inserting and extracting lithium or the like, the anode active material layer 12 contains a granulated graphite material 12B obtained by granulating a flat graphite particle 12A in nodular shape and mesocarbon microbeads 12C. The flat graphite particle 12A has a high discharge capacity. Further, by granulating the graphite particle 12A into a nodular secondary particle, diffusion path of lithium ions can be assured. Meanwhile, the mesocarbon microbeads 12C are rigid and functions as a filler material as well, thereby preventing the granulated graphite material 12B from being destroyed by compression molding.

As a flat graphite particle 12A, for example, scale-like shaped or scaly natural graphite, or scale-like shaped or scaly artificial graphite can be cited. One kind of the flat graphite particle 12A may be used singly, or several kinds thereof may be used by mixing.

The average particle diameter of the granulated graphite material 12B measured by laser diffraction method is preferably in the range from 10 μm to 30 μm, and more preferably in the range from 20 μm to 30 μm. Further, the particle diameter of the mesocarbon microbeads 12C measured by laser diffraction method is preferably in the range from 10 μm to 30 μm, and more preferably in the range from 20 μm to 30 μm. When the particle diameter of the granulated graphite material 12B is reduced, the surface area of the particle is increased and reactivity to the electrolytic solution is increased. However, when the particle diameter of the granulated graphite material 12B is too small, charge and discharge performance such as initial charge and discharge efficiency, cycle characteristics, and storage characteristics is lowered, and furthermore, the amount of the binder necessary to bond particles to each other is increased, and an energy density of the battery is decreased. Meanwhile, the particle diameter of the mesocarbon microbeads 12C is preferably in the foregoing range, since productivity can be thereby improved. Therefore, considering the particle diameter of the mesocarbon microbeads 12C and the operation as a filler material, the average particle diameter of the granulated graphite material 12B is desirably 30 μm or less, more desirably in the range from 20 μm to 30 μm.

The density of the anode active material layer 12 is preferably in the range from 1.5 g/cm$^3$ to 1.8 g/cm$^3$. When the density is small, the capacity per unit volume of the battery is decreased. When the density is large, the mesocarbon microbeads 12C are deformed, the granulated graphite material 12B is destroyed, and the diffusion path of lithium ions is decreased.

The weight ratio of the mesocarbon microbeads 12C to the total of the granulated graphite material 12B and the mesocarbon microbeads 12C (mesocarbon microbeads 12C/granulated graphite material 12B+mesocarbon microbeads 12C) is preferably in the range from 10% to 50%. When the ratio is low, effect to prevent the granulated graphite material 12B from being destroyed is low. When the ratio is high, the amount of the flat graphite particle 12A is decreased, and the capacity is decreased.

As an anode active material, other anode active material may be mixed to the foregoing carbon materials.

The anode 10 can be manufactured as follows, for example.

First, for example, an anode mixture is prepared by mixing the granulated graphite material 12B, the mesocarbon microbeads 12C, and the binder. The anode mixture is dispersed in a solvent such as N-methyl-2-pyrrolidone to obtain paste anode mixture slurry. Subsequently, the anode current collector 11 is coated with the anode mixture slurry, and the solvent is dried. After that, the resultant is compression-molded by a roll pressing machine or the like to form the anode active material layer 12.

The anode 10 is used for secondary batteries as follows, for example.

Figure 4:
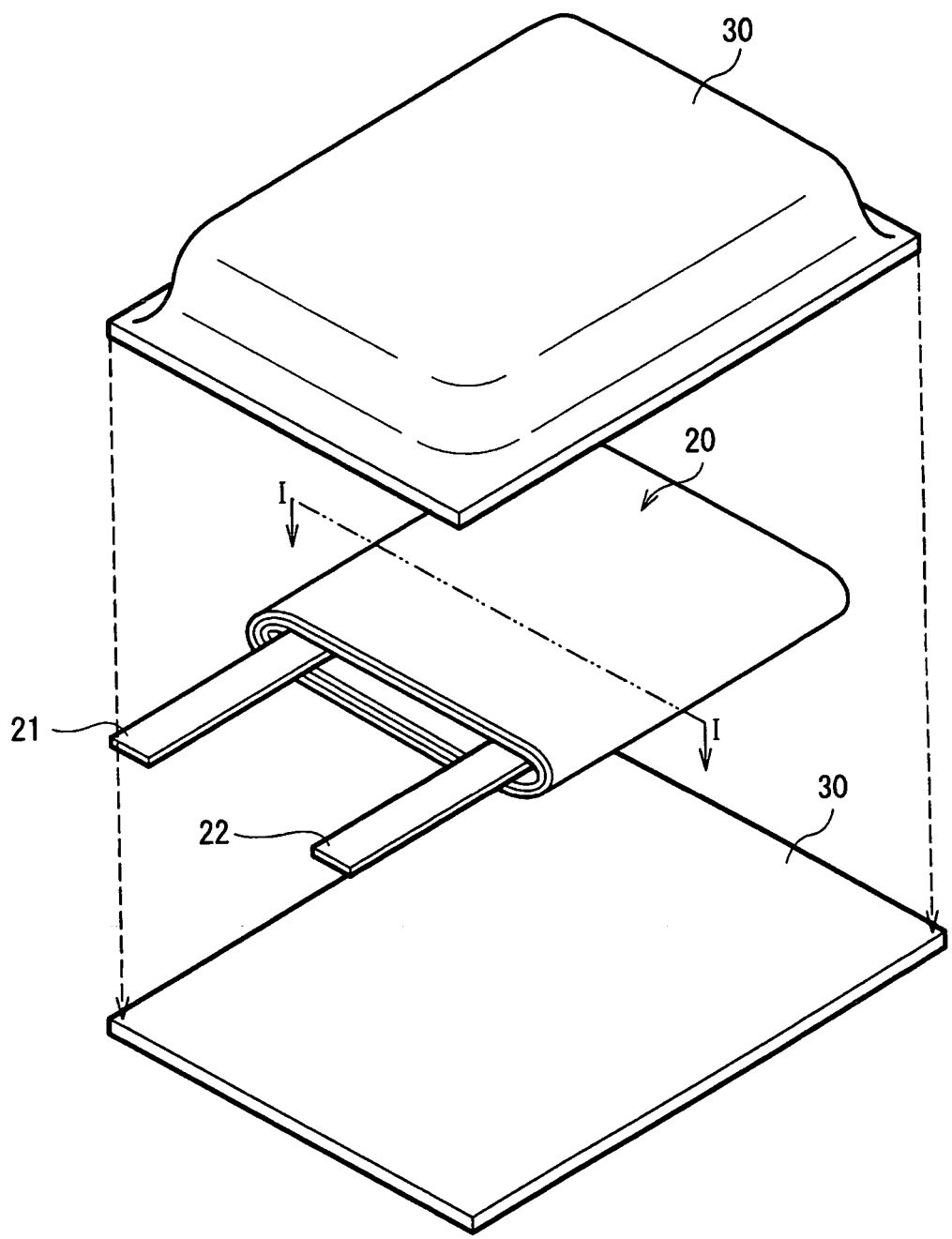
FIG. 4 is an exploded perspective view showing a structure of a secondary battery using the anode shown in FIG. 3.

FIG. 4 shows an exploded view of a structure of the secondary battery.

In the secondary battery, a spirally wound electrode body 20 on which a cathode lead 21 and an anode lead 22 are attached is enclosed in a film package member 30.

The cathode lead 21 and the anode lead 22 are respectively directed from inside to outside of the package member 30 in the same direction, for example. The cathode lead 21 and the anode lead 22 are respectively made of, for example, a metal material such as aluminum (Al), copper, nickel, and stainless, and are in a state of thin plate or mesh, respectively.

The package member 30 is made of a rectangular laminated film in which, for example, a nylon film, an aluminum foil, and a polyethylene film are bonded together in this order. The package member 30 is, for example, arranged so that the polyethylene film side and the spirally wound electrode body 20 are opposed, and the respective outer edges are contacted to each other by fusion bonding or an adhesive.

The package member 30 may be made of a laminated film having other structure, a high molecular weight film such as polypropylene, or a metal film, instead of the foregoing laminated film.

Figure 5:
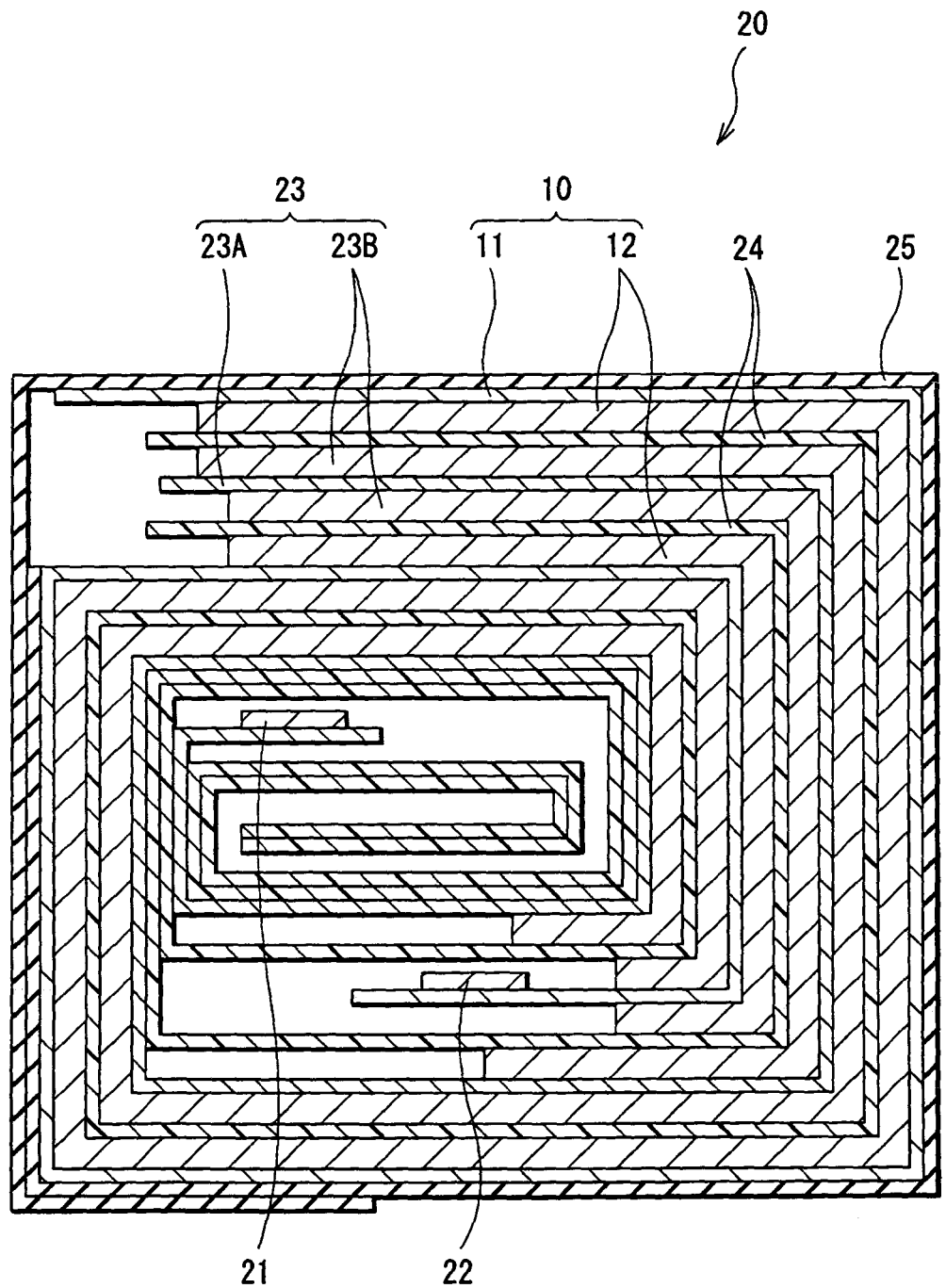
FIG. 5 is a cross section showing a structure taken along line I-I of a spirally wound electrode body shown in FIG. 4.

FIG. 5 shows a cross section structure taken along line I-I of the spirally wound electrode body 20 shown in FIG. 4. In the spirally wound electrode body 20, a cathode 23 and the anode 10 are layered with a separator 24 in between and wound. The outermost periphery thereof is protected by a protective tape 25.

The anode 10 has the foregoing structure. For example, the anode 10 has the anode current collector 11 and the anode active material layer 12 provided on the both faces or the single face of the anode current collector 11. Thereby, a high capacity, superior large current discharge characteristics, superior low temperature discharge characteristics and the like can be obtained. In the anode current collector 11, there is an exposed portion at one end in the longitudinal direction, which is not provided with the anode active material layer 11. The anode lead 22 is attached to the exposed portion. In FIG. 5, it is shown that the anode active material layer 12 is formed on the both faces of the anode current collector 11.

The cathode 23 has, for example, a cathode current collector 23A and a cathode active material layer 23B provided on the both faces or the single face of the cathode current collector 23A. In the cathode current collector 23A, there is an exposed portion at one end in the longitudinal direction, which is not provided with the cathode active material layer 23B. The cathode lead 21 is attached to the exposed portion. The cathode current collector 23A is made of a metal material such as an aluminum foil, a nickel foil, and a stainless foil.

The cathode active material layer 23B contains as a cathode active material, one or more cathode materials capable of inserting and extracting, for example, lithium, which is an electrode reactant. The cathode active material layer 23B may contain an electrical conductor such as graphite and a binder such as polyvinylidene fluoride according to needs. As a cathode material capable of inserting and extracting lithium, for example, a metal sulfide or an oxide containing no lithium such as $TiS_2$, $MoS_2$, $NbSe_2$, and $V_2O_5$, a lithium-containing compound such as a lithium oxide, a lithium sulfide, and an interlayer compound containing lithium, or a high molecular weight material can be cited.

In particular, in order to increase the energy density, a lithium complex oxide expressed by a general formula, $Li_1MIO_2$ or an interlayer compound containing lithium is preferable. MI represents one or more transition metals. MI is preferably at least one of cobalt (Co), nickel, manganese (Mn), iron (Fe), aluminum, vanadium (v), and titanium (Ti). The value of x varies according to charge and discharge states of the battery, and is generally in the range of $0.05 \leq x \leq 1.10$. As a specific example of such a lithium complex oxide and the like, $LiCoO_2$, $LiNiO_2$, $Li_yNi_zCo_{1-z}O_2$ (values of y and z vary according to charge and discharge states of the battery, and are generally in the range of $0<y<1$ and $0.7<z<1$), $LiMn_2O_4$ or the like can be cited. Further, a lithium phosphate compound such as $LiMIIPO_4$ (MII is one or more transition metals) having olivine type crystal structure is also preferable since a high energy density can be thereby obtained.

The separator 24 is made of, for example, a synthetic resin porous film made of polytetrafluoroethylene, polypropylene, polyethylene or the like, or a ceramics porous film. The separator 24 may have a structure in which two or more of the foregoing porous films are layered.

An electrolytic solution, which is a liquid electrolyte, is impregnated in the separator 24. The electrolytic solution contains, for example, a solvent such as a nonaqueous solvent and a lithium salt, which is an electrolyte salt dissolved in the solvent.

As a solvent, various nonaqueous solvents traditionally used for the nonaqueous electrolytic solution can be used. Specifically, propylene carbonate, ethylene carbonate, butylene carbonate, diethyl carbonate, dimethyl carbonate, ethyl methyl carbonate, y-butyrolactone, 1,2-dimethoxy ethane, 1,2-diethoxy ethane, tetrahydrofuran, 2-methyl tetrahydrofuran, 1,3-dioxolane, 4-methyl-1,3-dioxonane, diethyl ether, sulfolane, methyl sulfolane, acetonitrile, propionitrile, ester acetate, ester butyrate, ester propionate and the like can be cited. In particular, in view of oxidation stability, ester carbonate is preferably contained.

Further, a cyclic ester carbonate of an unsaturated compound is preferably contained in the solvent. The cyclic ester carbonate inhibits decomposition reaction of the solvent, and thereby can improve cycle characteristics. As a cyclic ester carbonate of an unsaturated compound, for example, 1,3-dioxole-2-one, 4-vinyl-1,3-dioxolane-2-one, and derivatives thereof can be cited.

As an electrolyte salt, for example, a lithium salt such as $LiPF_6$, $LiAsF_6$, $LiBF_4$, $LiClO_4$, $LiB(C_6H_5)_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, $LiC(CF_3SO_2)_3$, $LiC_4F_9SO_3$, $LiAlCl_4$, $LiSiF_6$, LiCl, and LiBr can be cited. One of the forgoing may be used singly, or two or more thereof may be used by mixing. Specially, $LiPF_6$ is preferable since high conductivity can be thereby obtained.

The content (concentration) of the lithium salt in the electrolytic solution is preferably in the range from 0.1 mol/l to 2.0 mol/l, or in the range from 0.1 mol/kg to 2.0 mol/kg. In such ranges, favorable ion conductivity can be obtained.

The secondary battery can be manufactured, for example, as follows.

First, for example, a cathode mixture is prepared by mixing a cathode active material, an electrical conductor, and a binder. The cathode mixture is dispersed in a solvent such as N-methyl-2-pyrrolidone to obtain paste cathode mixture slurry. Subsequently, the cathode current collector 23A is coated with the cathode mixture slurry, the solvent is dried. After that, the resultant is compression-molded by a roll pressing machine or the like to form the cathode active material layer 23B and to form the cathode 23.

Further, the anode 10 is formed as described above.

Next, the cathode lead 21 is attached to the cathode current collector 23A, and the anode lead 22 is attached to the anode current collector 11. The cathode 23 and the anode 10 are layered with the separator 24 in between to obtain a lamination. The lamination is wound to form the spirally wound electrode body 20.

Next, after the spirally wound electrode body 20 is sandwiched between the package members 30 made of a laminated film, outer edges except for one side of the package members 30 are bonded together to obtain a pouched state. Then, the cathode lead 21 and the anode lead 22 are derived outside of the package member 30.

Subsequently, an electrolytic solution is injected from the open sides into the package member 30, and impregnated in the separator 24. After that, the open sides of the package member 30 are bonded together. Thereby, the secondary battery shown in FIG. 4 and FIG. 5 is completed.

In the secondary battery, when charged, lithium ions are extracted from the cathode active material layer 23B and inserted in the anode active material layer 12 through the electrolytic solution. Further, when discharged, lithium ions are extracted from the anode active material layer 12 and inserted in the cathode active material layer 23B through the electrolytic solution. Here, since the density of the anode active material layer 12 is in the foregoing range, and the anode active material layer 12 contains the granulated graphite material 12B and the mesocarbon microbeads 12C, destruction of the granulated graphite material 12B is prevented.

As above, according to this embodiment, since the density of the anode active material layer 12 is in the range from 1.5 $g/cm^3$ to 1.8 $g/cm^3$, and the anode active material layer 12 contains the granulated graphite material 12B obtained by granulating the flat graphite particle 12A in nodular shape, a high capacity can be obtained. Further, since the anode active material layer 12 contains the mesocarbon microbeads 12C, destruction of the secondary particle granulated in nodular shape can be inhibited. Therefore, the capacity can be increased, and battery characteristics such as large current discharge characteristics and low temperature discharge characteristics can be improved.

In particular, when the weight ratio of the mesocarbon microbeads 12C to the total of the granulated graphite material 12B and the mesocarbon microbeads 12C (mesocarbon microbeads 12C/granulated graphite material 12B+mesocarbon microbeads 12C) is in the range from 10% to 50%, higher effect can be obtained.

EXAMPLES

Further, specific examples of the present invention will be hereinafter described in detail with reference to FIGS. 3 to 5 by using the same symbols.

Examples 1-1 to 1-5

First, lithium carbonate ($Li_2CO_3$) and cobalt carbonate ($CoCO_3$) were mixed at a mole ratio of $Li_2CO_3$: $CoCO_3$=0.5: 1, and the mixture was fired for 5 hours at 900 deg C. in the air to obtain a fired body. After X-ray diffraction measurement was performed on the obtained fired body, it was confirmed that the result well corresponded with the spectrum of $LiCoO_2$ registered in JCPDS file. Next, the fired body was pulverized to obtain $LiCoO_2$ powder, in which the accumulated 50% particle diameter obtainable by laser diffraction method was 15 μm.

Subsequently, the $LiCoO_2$ powder and $Li_2CO_3$ powder were mixed at a weight ratio of $LiCoO_2$ powder: $Li_2CO_3$powder=95:5. The mixture, Ketjen black, which is an electrical conductor, and polyvinylidene fluoride, which is a binder were mixed at a weight ratio of the mixture:Ketjen black:polyvinylidene fluoride=94:3:3 to prepare a cathode mixture. After that, the cathode mixture was dispersed in N-methyl-2-pyrrolidone, which is a solvent, to obtain cathode mixture slurry. After that, the both faces of the cathode current collector 23A made of a strip-shaped aluminum foil being 20 μm thick were uniformly coated with the cathode mixture slurry, which was dried and compression-molded by a roll pressing machine to form the cathode active material layer 23B and to form the cathode 23.

Further, the granulated graphite material 12B with an average particle diameter of 20 μm obtained by granulating the scale-like shaped graphite particle 12A in nodular shape as an anode active material, the mesocarbon microbeads 12C with an average particle diameter of 25 μm, and polyvinylidene fluoride, which is a binder, were mixed to prepare an anode mixture. Then, the total of the granulated graphite material 12B and the mesocarbon microbeads 12C:polyvinylidene fluoride (weight ratio) was 90:10. The average particle diameters of the granulated graphite material 12B and the mesocarbon microbeads 12C were measured by laser diffraction method. Further, the weight ratio of the mesocarbon microbeads 12C to the total of the granulated graphite material 12B and the mesocarbon microbeads 12C (mesocarbon microbeads 12C/granulated graphite material 12B+mesocarbon microbeads 12C) was changed in Examples 1-1 to 1-5 in the range from 5% to 55%. Further, in each example, the amount of the anode active material injected in the battery was the same. Subsequently, the anode mixture was dispersed in N-methyl-2-pyrrolidone, which is a solvent, to obtain anode mixture slurry. The both faces of the anode current collector 11 made of a strip-shaped copper foil being 15 μm thick were uniformly coated with the anode mixture slurry, which was dried and compression-molded by a roll pressing machine to form the anode active material layer 12 and to form the anode 12. Then, the density of the anode active material layer 12 was 1.5 g/cm$^3$.

After the cathode 23 and the anode 10 were formed, the cathode lead 21 made of aluminum was attached to the cathode 23, and the anode lead 22 made of nickel was attached to the anode 10. The cathode 23 and the anode 10 were layered with the separator 24 made of a microporous polyethylene oriented film being 25 μm thick in between, and the lamination was wound to obtain the spirally wound electrode body 20.

Next, after the spirally wound electrode body 20 was sandwiched between the package members 30 made of a laminated film, outer edges of the package member 30 except for one side were bonded together to obtain a pouched state. Then, the cathode lead 21 and the anode lead 22 were derived outside of the package member 30.

Subsequently, an electrolytic solution was injected from the open sides into the package member 30, and impregnated in the separator 24. After that, the open sides of the package member 30 were bonded together. Thereby, the secondary battery shown in FIG. 4 and FIG. 5 was obtained. For the electrolytic solution, the electrolytic solution in which $LiPF_6$ as an electrolyte salt was dissolved at a concentration of 1 mol/cm$^3$ in a mixed solvent of ethylene carbonate and propylene carbonate at equal volumes, and 1,3-dioxole-2-one was mixed at a content of 1 wt % to the electrolytic solution was used.

As Comparative examples 1-1 and 1-2 relative to Examples 1-1 to 1-5, secondary batteries were fabricated as in Examples 1-1 to 1-5, except that the anode was formed not using the mesocarbon microbeads or the granulated graphite material. Further, as Comparative examples 1-3 to 1-9, secondary batteries were fabricated as in Examples 1-1 to 1-5, except that the anode was formed so that the density of the anode active material layer was 1.4 g/cm$^3$. Then, the mesocarbon microbeads was not used in Comparative example 1-3, and the granulated graphite material was not used in Comparative example 1-9. Further, in Comparative examples 1-4 to 1-8, the weight ratio of the mesocarbon microbeads to the total of the granulated graphite material and the mesocarbon microbeads was 5%, 10%, 30%, 50%, and 55%. In Comparative examples 1-1 to 1-9, the amount of the anode active material injected in the battery was the same as in Examples 1-1 to 1-5.

For the fabricated secondary batteries of Examples 1-1 to 1-5 and Comparative examples 1-1 to 1-9, the discharge capacity, the capacity density, the large current discharge characteristics, and the low temperature discharge characteristics were examined. The results are shown in Table 1 and FIGS. 6 to 8.

Then, the discharge capacity, the capacity density, and the large current discharge characteristics were obtained as follows. First, constant current and constant voltage charge was performed under the conditions of 23 deg C., the upper limit voltage of 4.2 V, the current of 0.2 C, and the total charge time of 10 hours. After that, in the constant temperature bath set at 23 deg C., constant current discharge to the current of 0.2 C and the final voltage of 3.0 V was performed, and the discharge capacity was then obtained. Further, after charge was performed under the same conditions, in the constant temperature bath set at 23 deg C., constant current discharge to the current of 1 C and the final voltage of 3.0 V was performed, and the discharge capacity was then obtained. The large current discharge characteristics were obtained by the retention ratio of the discharge capacity at 1 C to the discharge capacity at 0.2 C, that is, (discharge capacity at 1 C/discharge capacity at 0.2 C)×100(%). Further, in Table 1, the discharge capacity at 23 deg C. and 0.2 C was shown. Further, the capacity density was obtained by (discharge capacity at 23 deg C. and 0.2 C/battery volume). 0.2 C means the current value at which the theoretical capacity is all discharged in 10 hours. 1 C means the current value at which the theoretical capacity is all discharged in 1 hour.

Further, the low temperature discharge characteristics were obtained as follows. First, constant current and constant voltage charge was performed under the condition of 23 deg C., the upper limit voltage of 4.2 V, the current of 0.2 C, and the total charge time of 10 hours. After that, in the constant temperature bath set at 23 deg C., constant current discharge to the current of 1 C and the final voltage of 3.0 V was performed, and the discharge capacity was then obtained. Further, after charge was performed under the same conditions, in the constant temperature bath set at 0 deg C., constant current discharge to the current of 1 C and the final voltage of 3.0 V was performed, and the discharge capacity was then obtained. The low temperature discharge characteristics were obtained by the retention ratio of (discharge capacity at 0 deg C. and 1 C) to (discharge capacity at 23 deg C. and 1 C), that is, (discharge capacity at 0 deg C. and 1 C/discharge capacity at 23 deg C. and 1 C)×100 (%).

increased as the ratio of the mesocarbon microbeads 12C became large, and then were decreased.

That is, it was found that when the density of the anode active material layer 12 was 1.5 g/cm³ and the anode active material layer 12 contained the granulated graphite material 12B and the mesocarbon microbeads 12C, a high capacity could be obtained, and superior large current discharge characteristics and superior low temperature discharge characteristics could be obtained. Further, it was found that the weight ratio of the mesocarbon microbeads 12C to the total of the granulated graphite material 12B and the mesocarbon microbeads 12C was preferably in the range from 10% to 50%.

Examples 2-1 and 2-2

Secondary batteries were fabricated as in Example 1-3, except that the density of the anode active material layer 12

TABLE 1

| | Density of anode active material layer (g/cm³) | Capacity density (mAh/cm³) | Weight ratio of MCMB (%) | Discharge capacity (mAh) [23 deg C., 0.2 C] | Discharge capacity retention ratio (%) [23 deg C., 1 C] | Discharge capacity retention ratio (%) [0 deg C., 1 C] |
|---|---|---|---|---|---|---|
| Example 1-1 | 1.5 | 84.4 | 5 | 698 | 92 | 62 |
| Example 1-2 | | 84.4 | 10 | 698 | 98 | 68 |
| Example 1-3 | | 84 | 30 | 695 | 98 | 68 |
| Example 1-4 | | 83.8 | 50 | 693 | 98 | 68 |
| Example 1-5 | | 82.4 | 55 | 682 | 98 | 68 |
| Comparative example 1-1 | 1.5 | 84.5 | 0 | 699 | 90 | 60 |
| Comparative example 1-2 | | 81.3 | 100 | 673 | 97 | 67 |
| Comparative example 1-3 | 1.4 | 82.7 | 0 | 700 | 97 | 67 |
| Comparative example 1-4 | | 82.6 | 5 | 699 | 98 | 68 |
| Comparative example 1-5 | | 82.5 | 10 | 698 | 99 | 69 |
| Comparative example 1-6 | | 82.2 | 30 | 696 | 99 | 69 |
| Comparative example 1-7 | | 81.9 | 50 | 693 | 99 | 69 |
| Comparative example 1-8 | | 80.5 | 55 | 681 | 98 | 68 |
| Comparative example 1-9 | | 79.3 | 100 | 671 | 98 | 68 |

MCMB: mesocarbon microbeads

Figure 6:
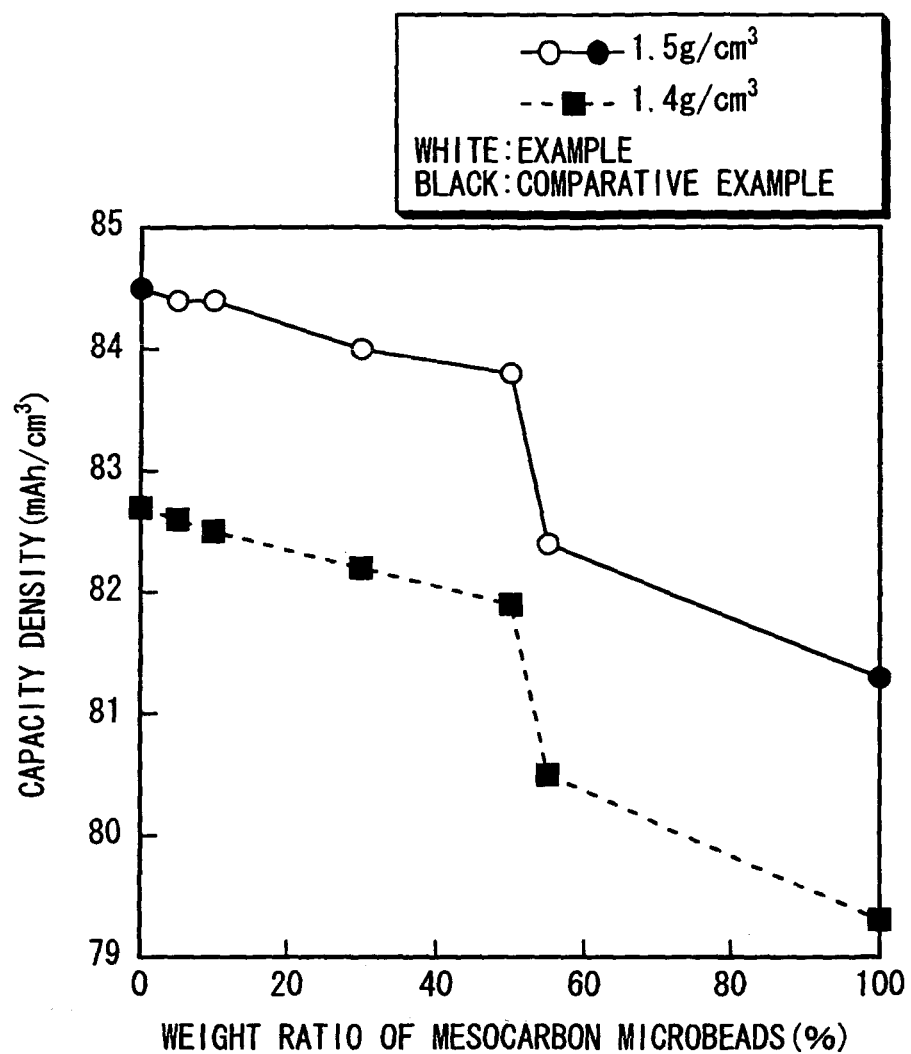
FIG. 6 is a characteristics view showing a relation between a weight ratio of mesocarbon microbeads and a capacity density.
Figure 7:
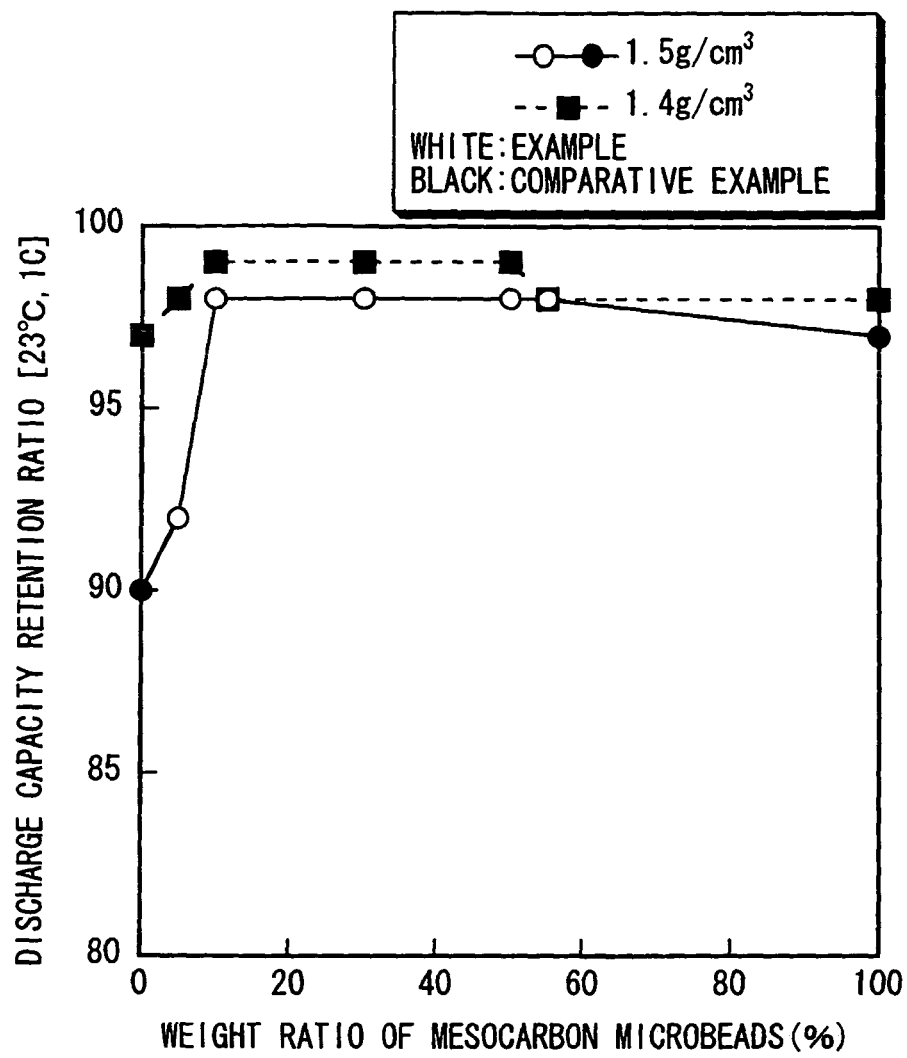
FIG. 7 is a characteristics view showing a relation between a weight ratio of mesocarbon microbeads and a discharge capacity retention ratio.
Figure 8:
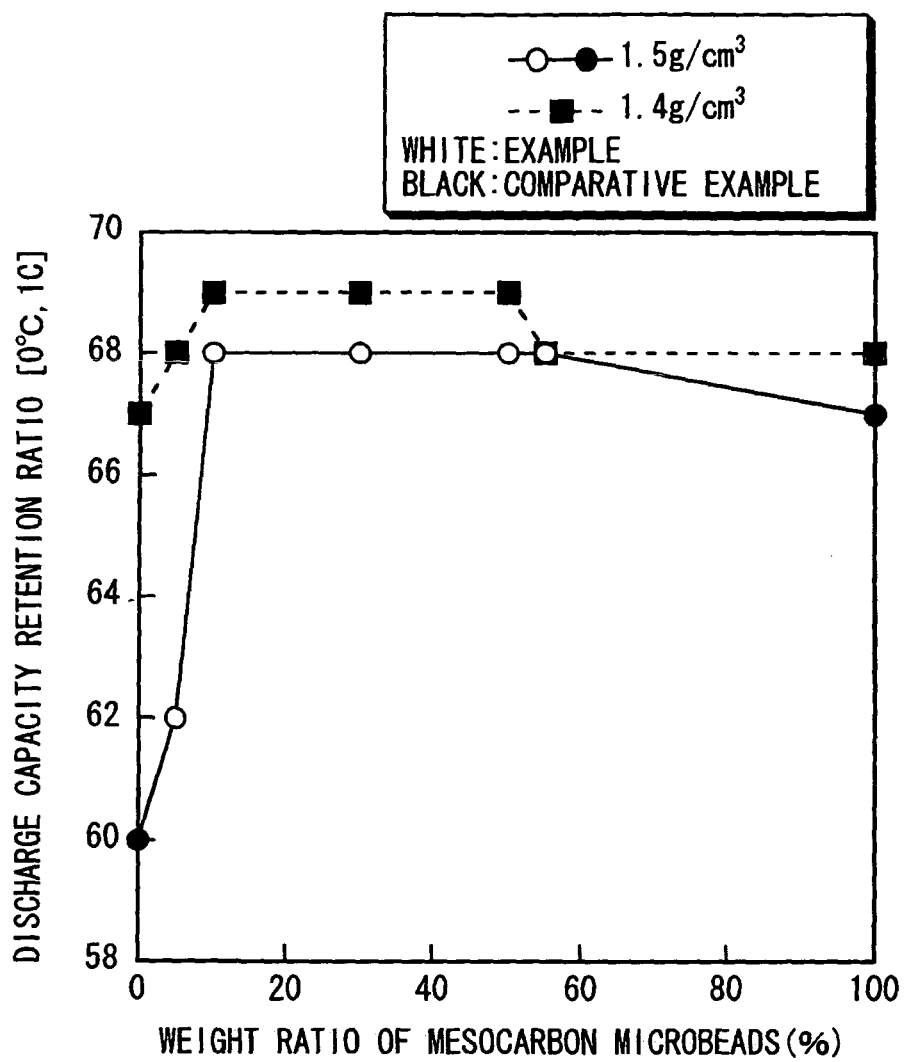
FIG. 8 is another characteristics view showing a relation between a weight ratio of mesocarbon microbeads and a discharge capacity retention ratio.

As evidenced by Table 1 and FIGS. 6 to 8, according to Examples 1-1 to 1-5, using the granulated graphite material 12B and the mesocarbon microbeads 12C, the discharge capacity retention ratio at 23 deg C. and 1 C and the discharge capacity retention ratio at 0 deg C. and 1 C were higher than in Comparative example 1-1 not using the mesocarbon microbeads 12C, and the discharge capacity at 23 deg C. and 0.2 C the capacity density were higher than in Comparative example 1-2 not using the granulated graphite material 12B. Meanwhile, according to Comparative examples 1-3 to 1-9, in which the density of the anode active material layer was 1.4 g/cm³, effects using the granulated graphite material and the mesocarbon microbeads were hardly shown, and each capacity density was lower than in Examples 1-1 to 1-5 and Comparative examples 1-1 and 1-2 with the same microbeads ratio. Further, the discharge capacity at 23 deg C. and 0.2 C and the capacity density became small as the ratio of the mesocarbon microbeads 12C became large. Further, the discharge capacity retention ratio at 23 deg C and 1 C and the discharge capacity retention ratio at 0 deg C. and 1 C were was 1.65 g/cm³ or 1.8 g/cm³. The weight ratio of the mesocarbon microbeads 12C to the total of the granulated graphite material 12B and the mesocarbon microbeads 12C was 30%. Further, in Examples 2-1 and 2-2, the amount of the anode active material injected in the battery was the same as in Example 1-3.

As Comparative examples 2-1 and 2-2 relative to Examples 2-1 and 2-2, secondary batteries were fabricated as in Examples 2-1 and 2-2, except that the density of the anode active material layer was 1.4 g/cm³ or 1.9 g/cm³. In Comparative examples 2-1 and 2-2, the amount of the anode active material injected in the battery was the same as in Examples 1-3, 2-1, and 2-2.

For the secondary batteries of Examples 2-1, 2-2, Comparative examples 2-1, and 2-2, the discharge capacity, the capacity density, the large current discharge characteristics, and the low temperature discharge characteristics were examined as in Examples 1-1 to 1-5. The results are shown in Table 2 and FIGS. 9 and 10 together with the results of Example 1-3.

TABLE 2

| | Density of anode active material layer (g/cm³) | Capacity density (mAh/cm³) | Discharge capacity (mAh) [23 deg C., 0.2 C] | Discharge capacity retention ratio (%) [23 deg C., 1 C] | Discharge capacity retention ratio (%) [0 deg C., 1 C] |
|---|---|---|---|---|---|
| Example 1-3 | 1.5 | 84 | 695 | 98 | 68 |
| Example 2-1 | 1.65 | 85 | 694 | 96 | 66 |
| Example 2-2 | 1.8 | 87 | 692 | 94 | 64 |
| Comparative example 2-1 | 1.4 | 82 | 694 | 98 | 68 |
| Comparative example 2-2 | 1.9 | 87 | 689 | 80 | 50 |

Figure 9:
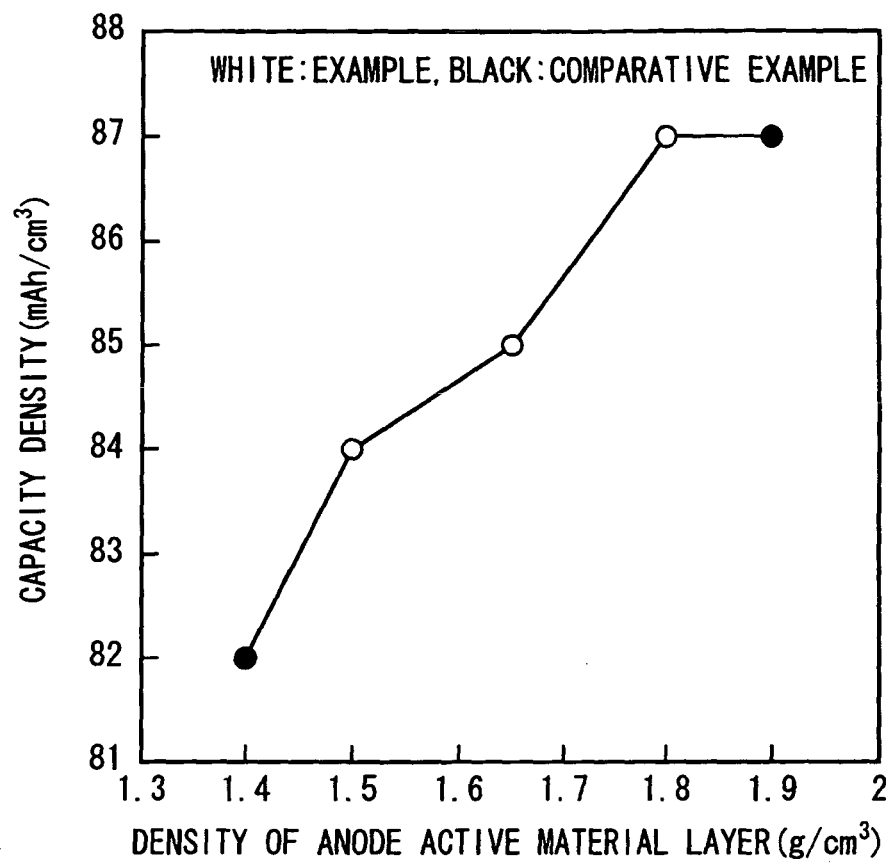
FIG. 9 is a characteristics view showing a relation between a density of an anode active material and a capacity density.
Figure 10:
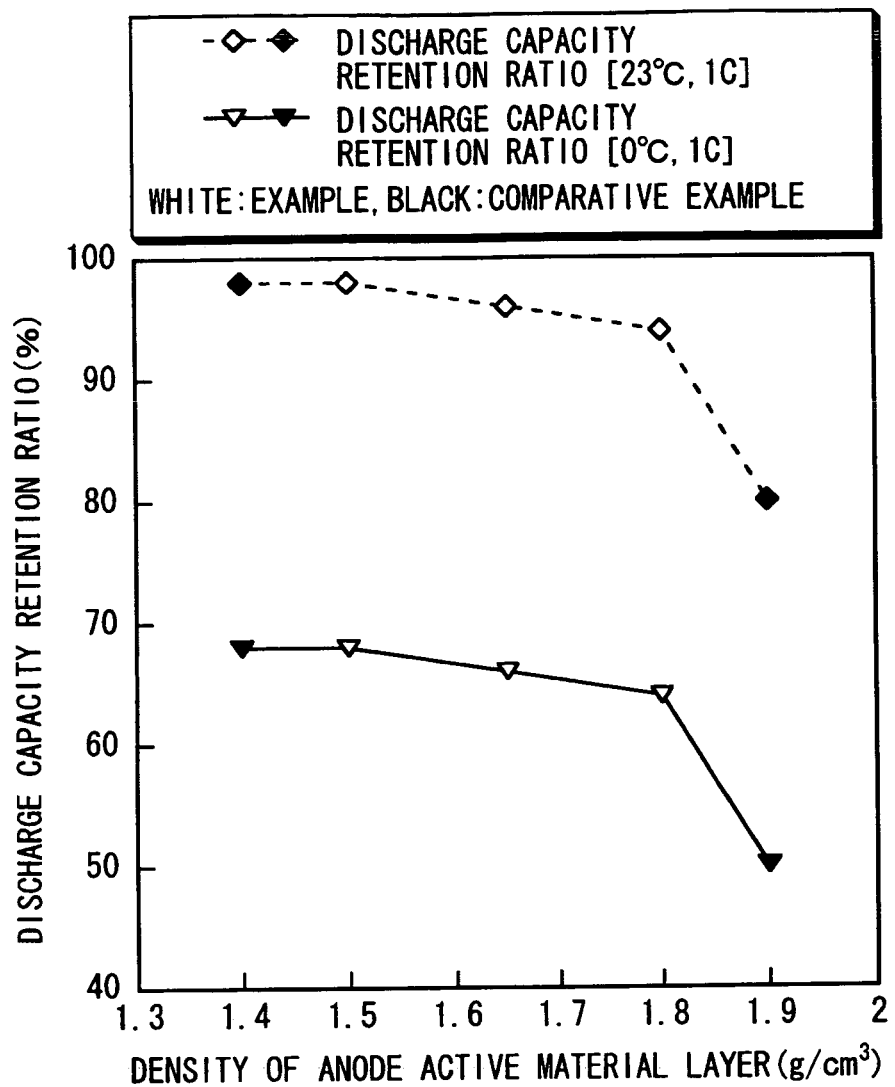
FIG. 10 is a characteristics view showing a relation between a density of the anode active material and a discharge capacity retention ratio.

As evidenced by Table 2 and FIGS. 9 and 10, according to Examples 1-3, 2-1, and 2-2, in which the density of the anode active material layer 12 was in the range from 1.5 g/cm³ to 1.8 g/cm³, the capacity density was larger than in Comparative example 2-1, in which the density of the anode active material layer was under 1.5 g/cm³, and the discharge capacity retention ratio at 23 deg C. and 1 C and the discharge capacity retention ratio at 0 deg C. and 1 C were higher than in Comparative example 2-2, in which the density of the anode active material layer was over 1.8 g/cm³.

That is, it was found that the density of the anode active material layer 12 was preferably in the range from 1.5 g/cm³ to 1.8 g/cm³.

The present invention has been described with reference to the embodiment and the examples. However, the present invention is not limited to the embodiment and the examples, and various modifications may be made. For example, in the foregoing embodiment and examples, descriptions have been given of the case, in which the cathode 23 and the anode 10 are wound. However, a plurality of cathodes and anodes may be layered or folded. Further, the present invention can be applied to a battery such as a cylinder-type battery, a square-type battery, a coin-type battery, and a button-type battery using a can for the package member.

Further, in the foregoing embodiment and examples, descriptions have been given of the case using the electrolytic solution as it is. However, the electrolytic solution may be held by a holding body such as a high molecular weight compound to form into a gelatinous state. As a high molecular weight compound, for example, a copolymer of polyvinylidene fluoride and vinylidene fluoride can be cited. As the copolymer monomer thereof, hexafluoropropylene, tetrafluoro ethylene or the like can be cited. They are preferable since high battery characteristics can be thereby obtained. Specially, a copolymer of vinylidene fluoride and hexafluoropropylene is particularly preferable.

It should be understood by those skilled in the art that various modifications, combinations, sub-combinations and alternations may occur depending on design requirements and other factors insofar as they are within the scope of the appended claims or the equivalents thereof.

What is claimed is:

1. An anode active material comprising:
a plurality of particles of granulated graphite material which is obtained by granulating flat graphite particles in nodular shape, each particle of the granulated graphite material including a plurality of flat graphite particles; and
mesocarbon microbeads,
wherein a density of the anode active material is in a range from 1.65 g/cm³ to 1.8 g/cm³, a weight ratio of the mesocarbon microbeads to a total of the granulated graphite material and the mesocarbon microbeads (mesocarbon microbeads/granulated graphite material +mesocarbon microbeads) is in a range from 10% to 50%, and an average particle diameter of each particle of the granulated graphite material measured by a laser diffraction method is in a range from 10 microns to 30 microns.

2. The anode active material according to claim 1, wherein the average particle diameter of the mesocarbon microbeads or each particle of the granulated graphite material measured by the laser diffraction method is in a range from 20 microns to 30 microns.

3. A battery comprising:
a cathode;
an anode; and
an electrolyte,
wherein the anode has an anode active material, the anode active material having a density in a range from 1.65 g/cm³ to 1.8 g/cm³, the anode active material contains a plurality of particles of granulated graphite material which is obtained by granulating flat graphite particles in nodular shape and mesocarbon microbeads, each particle of the granulated graphite material including a plurality of flat graphite particles, a weight ratio of the mesocarbon microbeads to a total of the granulated graphite material and the mesocarbon microbeads (mesocarbon microbeads/granulated graphite material +mesocarbon microbeads) is in a range from 10% to 50%, and an average particle diameter of each particle of the granulated graphite material measured by a laser diffraction method is in a range from 10 micron to 30 micron.

4. The battery according to claim 3, wherein the average particle diameter of the mesocarbon microbeads or each particle of the granulated graphite material measured by the laser diffraction method is in a range from 20 microns to 30 microns.

5. The anode active material according to claim 1, wherein a capacity density of the active anode material is in a range of 85 to 87 mAh/cm³.

* * * * *